United States Patent [19]
Cullen

[11] Patent Number: 5,775,069
[45] Date of Patent: *Jul. 7, 1998

[54] DENSITY CONTROL MEANS FOR AN AGRICULTURAL FEED BAGGING MACHINE

[75] Inventor: Steven R. Cullen, Astoria, Oreg.

[73] Assignee: Versa Corporation, Astoria, Oreg.

[ * ] Notice: The term of this patent shall not extend beyond the expiration date of Pat. No. 5,671,594.

[21] Appl. No.: 876,352

[22] Filed: Jun. 16, 1997

Related U.S. Application Data

[63] Continuation of Ser. No. 762,195, Dec. 9, 1996, Pat. No. 5,671,594, which is a continuation of Ser. No. 448,995, May 24, 1995, abandoned.

[51] Int. Cl.⁶ ..................................................... B65B 1/24
[52] U.S. Cl. ..................... 53/567; 53/576; 53/255; 53/527; 53/529; 100/100; 100/144; 141/73; 141/74
[58] Field of Search ........................... 53/255, 257, 260, 53/527, 529, 530, 551, 567, 576; 100/65, 66, 100, 144, 212; 141/71, 73, 74, 114

[56] References Cited

U.S. PATENT DOCUMENTS

| | | |
|---|---|---|
| 1,662,147 | 3/1928 | Farden . |
| 2,174,228 | 9/1939 | Perkins . |
| 2,250,910 | 7/1941 | Hiett . |
| 3,621,775 | 11/1971 | Dedio et al. . |
| 3,791,593 | 2/1974 | Griffin . |
| 3,815,323 | 6/1974 | Longo . |
| 4,046,068 | 9/1977 | Eggenmüller et al. . |
| 4,308,901 | 1/1982 | Lee . |
| 4,310,036 | 1/1982 | Rasmussen et al. . |
| 4,337,805 | 7/1982 | Johnson et al. . |
| 4,502,378 | 3/1985 | Cullen . |
| 4,572,064 | 2/1986 | Burton . |
| 4,621,666 | 11/1986 | Ryan . |
| 4,653,553 | 3/1987 | Cox et al. . |
| 4,688,480 | 8/1987 | Ryan . |
| 4,724,876 | 2/1988 | Ryan . |
| 4,788,901 | 12/1988 | Klinner et al. . |
| 4,792,031 | 12/1988 | Warner et al. . |
| 4,945,715 | 8/1990 | Brodrecht . |
| 4,949,633 | 8/1990 | Johnson et al. . |
| 5,009,062 | 4/1991 | Urich et al. . |
| 5,159,877 | 11/1992 | Inman et al. . |
| 5,269,829 | 12/1993 | Meyer . |
| 5,295,554 | 3/1994 | Cullen . |
| 5,297,377 | 3/1994 | Cullen . |
| 5,425,220 | 6/1995 | Cullen . |
| 5,463,849 | 11/1995 | Cullen . |
| 5,464,049 | 11/1995 | Cullen . |
| 5,517,806 | 5/1996 | Cullen . |
| 5,671,594 | 9/1997 | Cullen . |

*Primary Examiner*—Daniel Moon
*Attorney, Agent, or Firm*—Zarley, McKee, Thomte, Voorhees & Sease; Dennis L. Thomte

[57] ABSTRACT

A density control cable is provided on an agricultural bagging machine for engagement with the material being bagged as the material is forced past the density control means into the bag being filled with agricultural material. A beveled press plate is provided on the bagging machine frame rearwardly of the rotor on the bagging machine for forcing the agricultural material upwardly, rearwardly and outwardly as the material passes thereby. A hydraulic cylinder is operatively connected to the density control cable to enable the width of the loop of the cable to be selectively varied.

1 Claim, 4 Drawing Sheets

DENSITY CONTROL MEANS FOR AN AGRICULTURAL FEED BAGGING MACHINE

CROSS-REFERENCE TO RELATED APPLICATION

This is a continuation application of application Ser. No. 08/762,195 filed Dec. 9, 1996, now U.S. Pat. No. 5,671,594 which is a continuation application of application Ser. No. 08/448,995 filed May 24, 1995, now abandoned.

BACKGROUND OF THE INVENTION

1. Field of the Invention

This invention relates to an agricultural feed bagging machine and more particularly to an agricultural feed bagging machine having means associated therewith to control the density of the material being packed in the bag without the need for a backstop and cable brakes.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. As silage is loaded into the bag, the bagging machine moves away from the filled end of the bag in a controlled fashion so as to achieve uniform compaction of the silage material within the bag. In U.S. Pat. No. 4,337,805, silage is forced by means of a rotor from the intake chamber of the machine through the output chamber of the machine and into the agricultural bag with a backstop structure yieldably engaging the closed end of the agricultural bag to resist the movement of the bagging machine away from the filled end of the agricultural bag as silage is forced into the bag. The structure of the '805 patent includes a pair of drums rotatably mounted on the bagging machine with a brake associated therewith for braking or resisting the rotation of the drum with a selected brake force. A cable is wrapped around the drum and is connected to the backstop.

Although the cable drum and backstop structure of the '805 patent and other similar machines do function generally satisfactorily, the cables, which are positioned on opposite sides of the bag, can create openings or holes in the bag which will adversely affect the fermentation process within the bag. A further disadvantage of the cable drum and backstop structure of the devices such as shown in the '805 patent is that the cables must be rewound after the filing of an individual bag. A further disadvantage of the cable drum and backstop structure of the machine such as disclosed in the '805 patent is that a dangerous condition exists should one of the cables break.

In an effort to overcome some of the disadvantages of machines such as disclosed in the '805 patent, an attempt was made in U.S. Pat. No. 4,621,666 to achieve the desired bagging operation while eliminating the need for the cable drum and backstop structure. In the '666 patent, the wheels on the bagging machine were braked to provide the desired resistance to the filling of the bag. Although the brake system of the '666 patent apparently met with some success, it is believed that machines such as disclosed in the '666 patent experience slippage difficulties in wet field conditions which adversely affect the bagging operation. It is also believed that the brake means alone on the bagging machine such as those disclosed in the '666 patent do not achieve the desired compaction of the silage material within the bag.

In applicant's co-pending application Ser. No. 07/912,873, now abandoned, a bagging machine is described which has the capability of enabling the density of the silage material to be selectively controlled without the need of an elaborate braking system. Although the bagging machine of Ser. No. 07/912,873 now abandoned, does satisfactorily achieve all of its objectives, a more simple way of controlling the density of the bagged material was discovered and was the subject of the U.S. Pat. No. 5,297,377 Although the density control means described in U.S. Pat. No. 5,297,377 did represent a significant advance in the art, it is believed that the instant invention likewise represents a significant advance over the prior art.

U.S. Pat. No. 5,297,377, a density control means was described which included a plurality of cables which were positioned in the flow of the silage material being bagged. In order to vary the density of the material in the machine of U.S. Pat. No. 5,297,377, more or less cables would be employed based on the material being packed. For example, corn silage flows easy and would require more cables while alfalfa packs hard and would use less cables. The need to have a convenient means for varying the density, by way of the density control cables, exists and the instant invention provides such a means.

In U.S. Pat. No. 5,425,220, a density control means was described which included a pair of intersecting cables positioned in the flow of the silage material being bagged. In order to vary the density of the material in the machine of U.S. Pat. No. 5,425,220, the relationship of the intersecting or criss-crossing cables was varied.

SUMMARY OF THE INVENTION

An agricultural feed bagging machine is disclosed which comprises a wheeled frame having rearward and forward ends. A tunnel is provided on the wheeled frame and has an intake end for receiving silage material and an output end adapted to receive the mouth of an agricultural bag. A hopper is provided on the wheeled frame for receiving the silage material and is adapted to supply the same to a rotatable rotor which forces the silage into the tunnel means and into the bag. The density control means of this invention comprises a U-shaped cable which extends rearwardly from the wheeled frame below the rotor. A hydraulic cylinder operated trolley arrangement is operatively connected to the U-shaped cable to change the spacing between the leg portions of the U-shaped cable.

It is therefore a principal object of the invention to provide an improved agricultural feed bagging machine.

A further object of the invention is to provide an agricultural bagging machine having means at the output end of the tunnel for increasing the density of the silage material being forced through the tunnel into the bag.

A further object of the invention is to provide a density control means for an agricultural feed bagging machine including a U-shaped cable positioned in the tunnel below the rotor with the width of the cable being adjustable by means of a hydraulic cylinder operatively connected to a trolley arrangement operatively connected to the cable.

Yet another object of the invention is to provide an agricultural bagging machine having a beveled press plate located rearwardly of the rotor for guiding the material being packed upwardly and outwardly with respect thereto.

These and other objects of the invention will be apparent to those skilled in the art.

DESCRIPTION OF THE PREFERRED EMBODIMENTS

Figure 1:
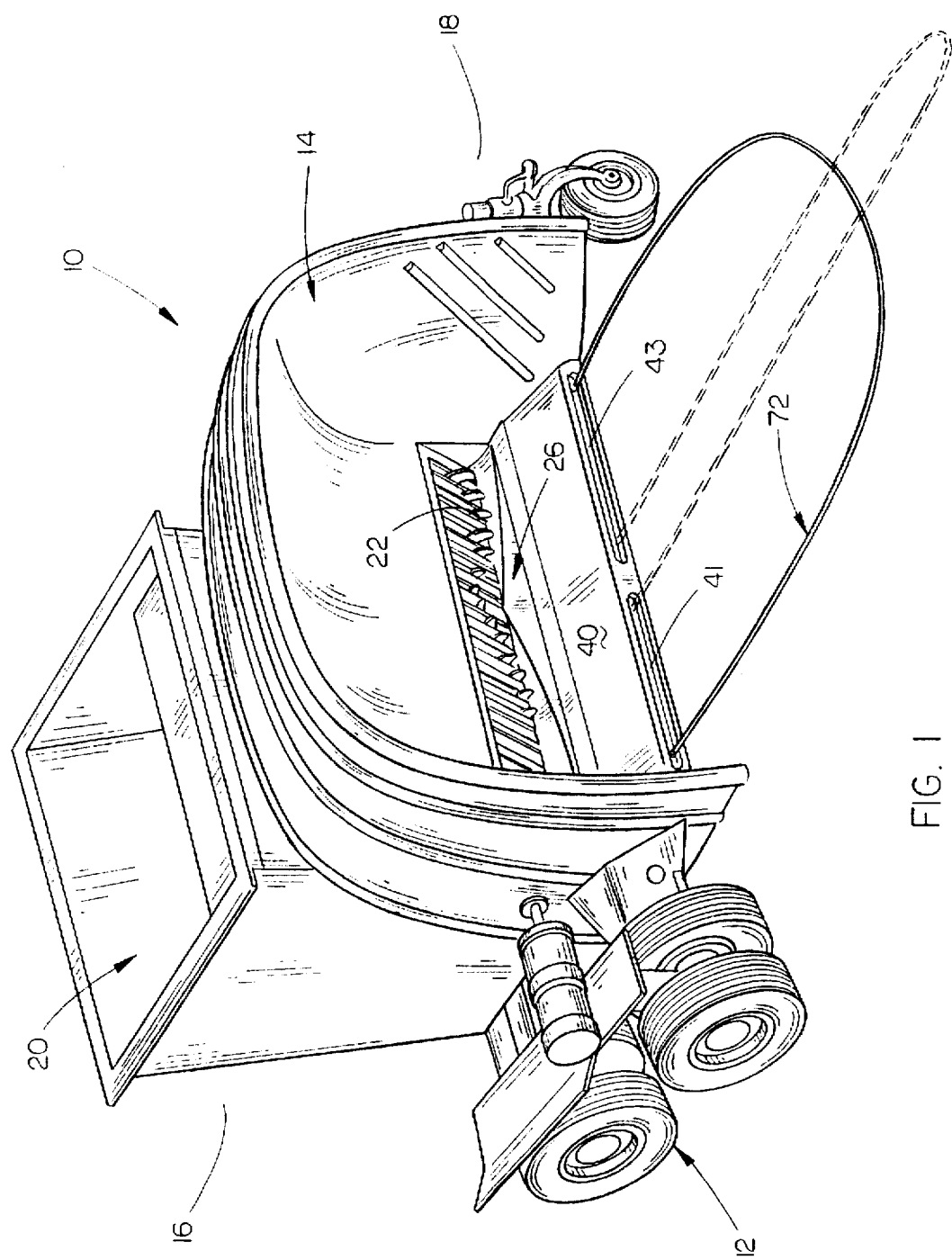
FIG. 1 is a rear perspective view of the agricultural bagging machine of this invention.
Figure 2:
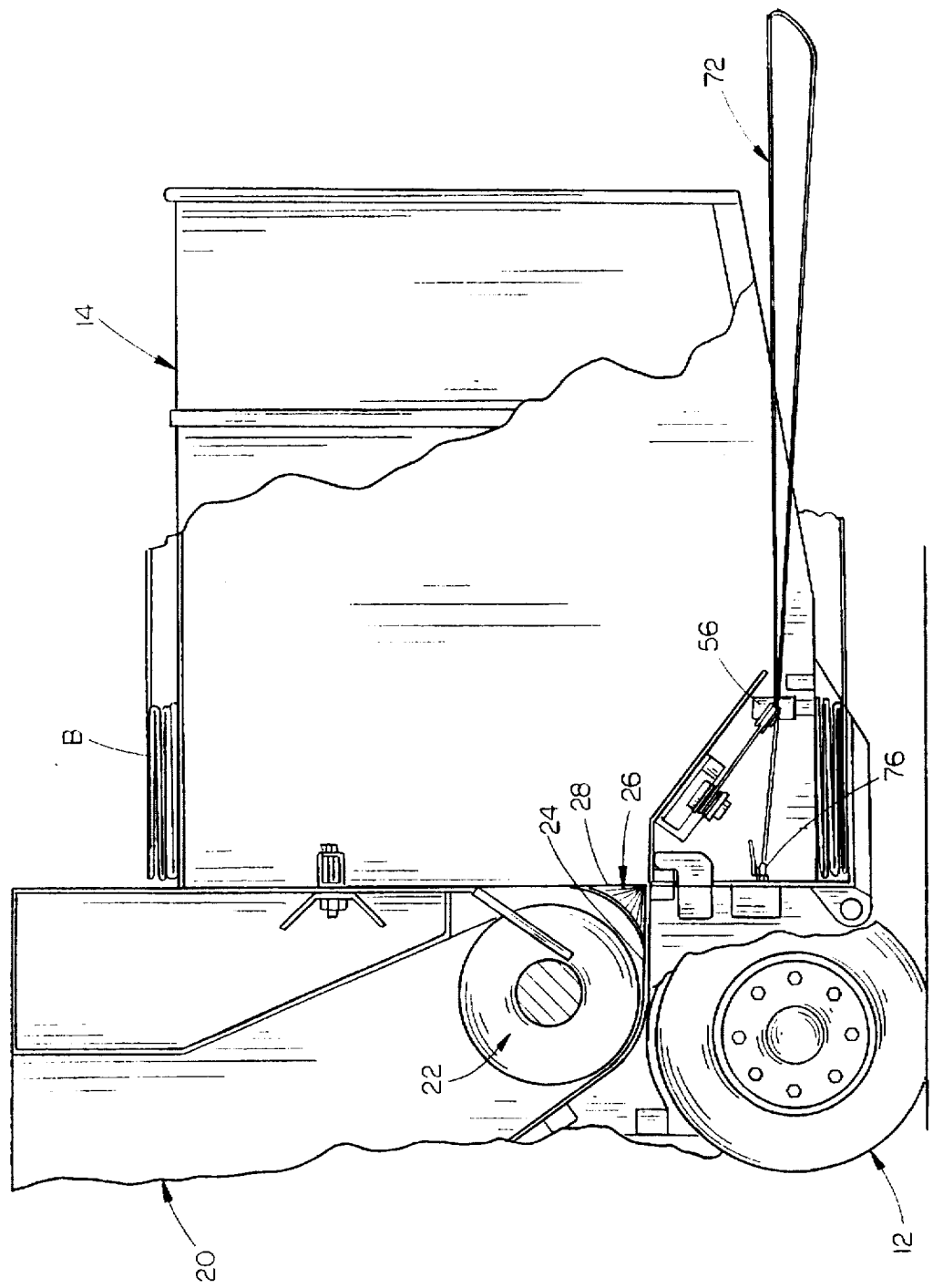
FIG. 2 is a partial longitudinal vertical sectional view of the bagging machine of this invention.
Figure 3:
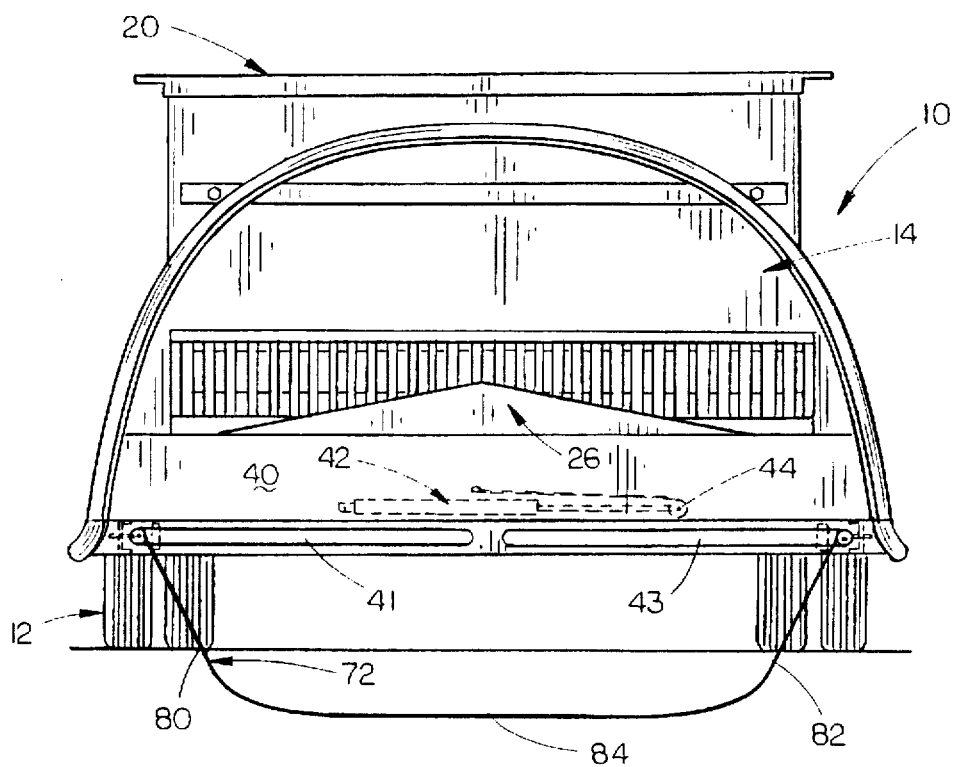
FIG. 3 is a rear view of the bagging machine with the U-shaped density control cable being at its widest position.

The numeral 10 refers generally to an agricultural bagging machine which is substantially conventional in design except for the new density control means positioned within the tunnel and the beveled press plate as will be described hereinafter.

Machine 10 includes a wheeled frame 12 having a tunnel 14 mounted thereon upon which is normally positioned the open mouth of a conventional agricultural bag B. Although the preferred embodiment includes a wheeled frame, a non-wheeled frame could also be employed. For purposes of conciseness, the power means for driving the various components of the machine will not be disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A horizontally disposed rotatable rotor 22 of conventional design is located at the lower end of the hopper means 20 for forcing the materials to be bagged into the tunnel 14 and into the bag B in conventional fashion.

For purposes of description, frame 12 includes a floor 24 located beneath rotor 22 and which extends rearwardly therefrom. The numeral 26 refers to a beveled press plate positioned on the rearward end of the floor 24 as seen in the drawings. Press plate 26 includes a back wall 28 having opposite ends 30 and 32. The numeral 34 refers to the front wall of the press plate including front wall portions 36 and 38. As seen in the drawings, front wall portion 36 is angled with respect to the direction of flow of material as is front wall portion 38. Front wall portion 36 extends upwardly and outwardly as does front wall portion 38. Thus, the material being bagged, upon being forced by the rotor into engagement with the beveled press plate 26, will be moved upwardly, outwardly and rearwardly with respect to the center line 39 of the beveled press plate 26.

Tunnel 14 includes a floor 40 which extends rearwardly from the lower rearward end of beveled press plate 26 and thence downwardly and rearwardly therefrom. The lower rearward end of floor 40 includes a pair of elongated horizontally disposed slots 41 and 43, as best illustrated in FIG. 1.

Figure 4:
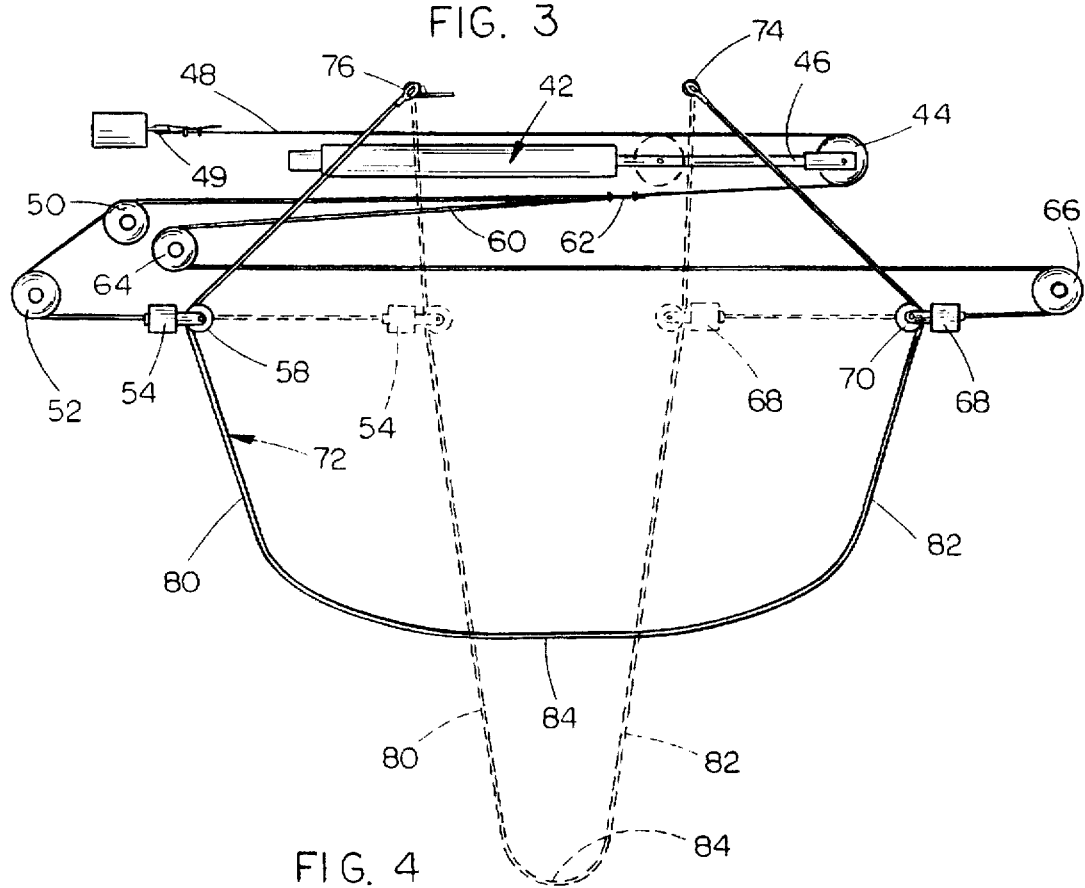
FIG. 4 is a schematic view illustrating the manner in which the U-shaped density control cable is widened and narrowed.
Figure 5:
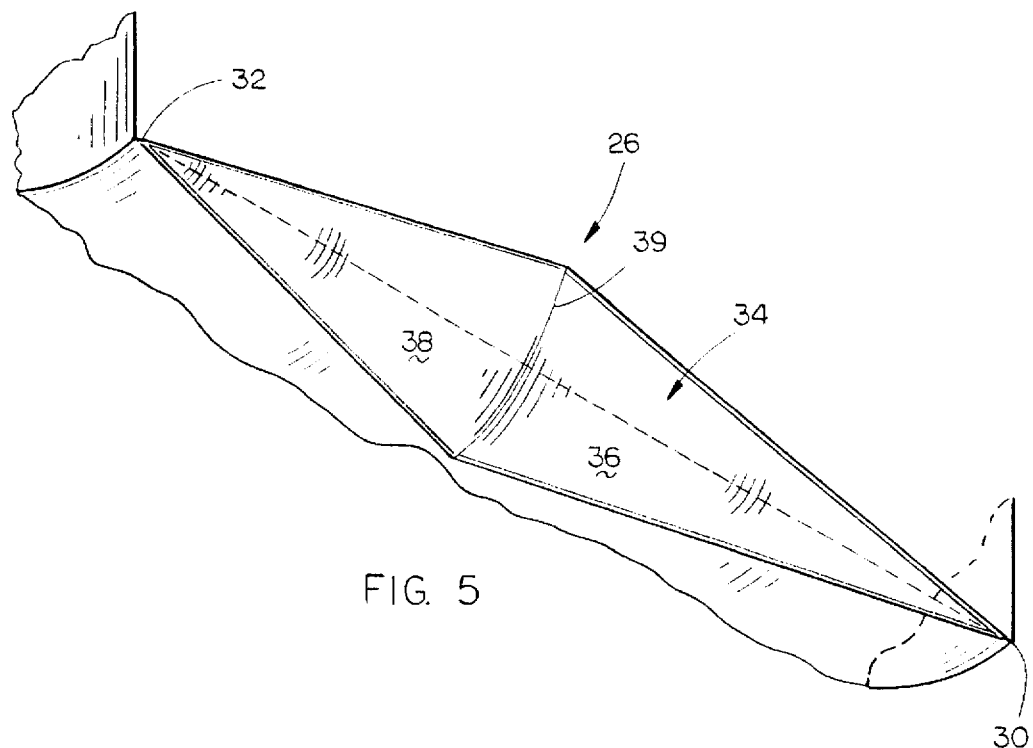
FIG. 5 is a front perspective view of the beveled press plate portion of this invention.
Figure 6:
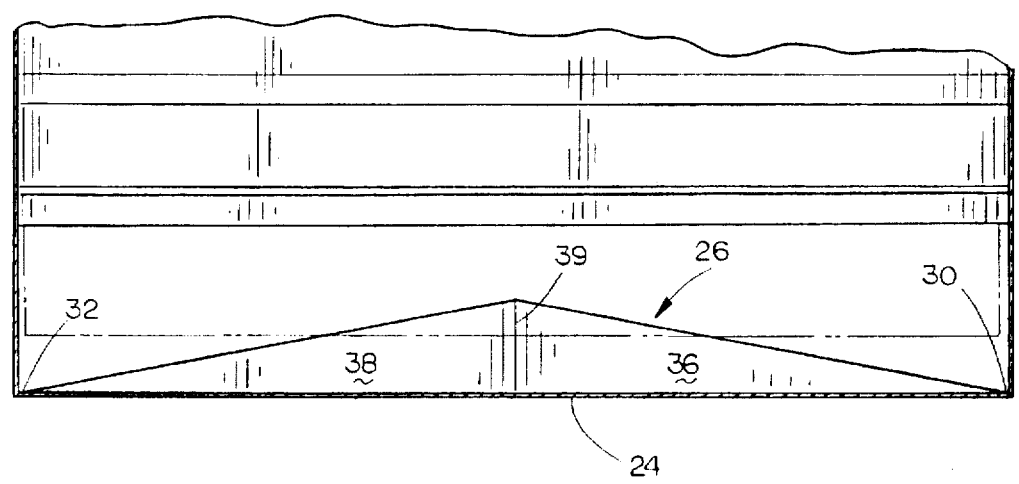
FIG. 6 is a front view of the beveled press plate portion of this invention.

A hydraulic cylinder 42 is secured to and is supported beneath the floor 40 and has a pulley 44 secured to its rod 46. One end of a cable 48 is connected to the underside of the floor 40 at 49 and extends around pulley 44 as illustrated in FIG. 4. Cable 48 also extends around pulleys 50 and 52 operatively mounted on the underside of the floor 40. The end of cable 48 is secured to a trolley 54 which is longitudinally movably mounted in an elongated trolley tube 56 in conventional fashion. Trolley 54 has a pulley 58 rotatably mounted thereon for movement therewith. The numeral 60 refers to a cable which is secured to cable 48 at 62 and which extends around pulleys 64 and 66 which are operatively rotatably mounted on the underside of floor 40. The end of cable 60 is operatively secured to trolley 68 which is longitudinally movably mounted in the trolley tube 56 in conventional fashion. Pulley 70 is rotatably mounted on the trolley 68 for movement therewith.

The numeral 72 refers to a density control cable having one end fixedly secured to frame 12 at 74. Cable 72 extends rearwardly from 74 and extends around pulley 70. Cable 72 also extends around pulley 58, as illustrated in FIG. 4, and then extends forwardly to a releasable connection on the main frame generally referred to by the reference numeral 76.

When hydraulic cylinder 42 is extended, the pulleys 58 and 70 will be pulled or moved outwardly in the trolley tube 56 so that a very wide cable loop is presented to the material passing rearwardly through the tunnel. When cylinder 42 is retracted and feed is being forced rearwardly through the tunnel, the feed forced through the density cable 72 will cause the pulleys 58 and 70 to move inwardly towards one another as illustrated by the broken lines in FIG. 4 so that a narrow loop is provided. For purposes of description, density control cable 74 will be described as including leg portions 80 and 82 joined by base portion 84.

Thus, a novel means has been provided to adjust the cable density system to enable the system to work in all extreme conditions of materials, for example, long and fibrous, or mushy like brewers grain, or beet pulp. The described system works extremely well from a full wide loop to a very narrow loop, which is believed to be primarily responsible due to the fact that the cable is located below the rotor. Applicant's invention enables the density of the materials to be reduced by completely narrowing the loop in coarse material. The cooperation of the density control cable 72 and the beveled press plate 26 makes the finished bag smooth, regardless of the condition of the material being bagged. A smooth bag is also enhanced by the use of the grader edge 78 such as disclosed in U.S. Pat. No. 5,398,736.

Thus it can be seen that the invention accomplishes at least all of its stated objectives.

I claim:

1. An agricultural bagging machine for bagging agricultural material into an agricultural bag having a closed end and an open mouth comprising:

a frame having rearward and forward ends;

a tunnel on said frame having an intake end for receiving the material to be bagged and an output end adapted to receive the open mouth of the agricultural bag;

said tunnel having a top wall and opposite side walls;

a hopper on said frame forwardly of said tunnel for receiving the material to be bagged;

a horizontally disposed rotor at the intake end of said tunnel for forcing the material to be bagged from said hopper through said tunnel and into said bag;

and a density control means positioned between the side walls of said tunnel for engagement with the material being bagged as the material is forced past said density control means and into said bag to control the density of the material;

said density control means comprising an elongated flexible cable positioned between the side walls of said tunnel to define a first generally U-shaped cable loop having spaced-apart first and second leg portions joined by a base portion;

said leg portions having forward ends positioned forwardly of said base portion;

engagement means in engagement with said U-shaped cable loop to permit the spacing between said first and second leg portions to be selectively changed;

said cable dwelling in a generally horizontally disposed plane positioned below said rotor.

* * * * *